(12) United States Patent
Takamoto et al.

(10) Patent No.: US 8,214,542 B2
(45) Date of Patent: Jul. 3, 2012

(54) USB HOST, CONTROL METHOD THEREOF, COMPUTER PROGRAM, USB HUB AND USB DEVICE FOR ALLOWING UPGRADED OPERATION

(75) Inventors: Akio Takamoto, Matsumoto (JP);
Takeshi Yamada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 474 days.

(21) Appl. No.: 12/383,480

(22) Filed: Mar. 24, 2009

(65) Prior Publication Data
US 2009/0248904 A1  Oct. 1, 2009

(30) Foreign Application Priority Data
Mar. 25, 2008  (JP) .................................. 2008-078330

(51) Int. Cl.
*G06F 3/00* (2006.01)
(52) U.S. Cl. ................... 710/8; 710/62; 340/5.8; 713/1; 713/100; 726/2
(58) Field of Classification Search .................. None
See application file for complete search history.

(56) References Cited

U.S. PATENT DOCUMENTS

| | | | | |
|---|---|---|---|---|
| 5,260,804 A | * | 11/1993 | Fukutomi et al. | 358/444 |
| 5,576,847 A | * | 11/1996 | Sekine et al. | 358/448 |
| 6,735,720 B1 | * | 5/2004 | Dunn et al. | 714/43 |
| 6,804,727 B1 | * | 10/2004 | Rademacher | 710/9 |
| 7,111,324 B2 | * | 9/2006 | Elteto et al. | 726/9 |
| 7,222,240 B2 | * | 5/2007 | Elteto | 713/185 |
| 7,685,322 B2 | * | 3/2010 | Bhesania et al. | 710/8 |
| 2005/0278521 A1 | * | 12/2005 | Hirai | 713/1 |
| 2007/0127088 A1 | * | 6/2007 | Chien | 358/474 |
| 2007/0204069 A1 | * | 8/2007 | Bhesania et al. | 710/8 |
| 2007/0239903 A1 | * | 10/2007 | Bhardwaj et al. | 710/8 |
| 2007/0245333 A1 | * | 10/2007 | Ferlitsch | 717/168 |

(Continued)

FOREIGN PATENT DOCUMENTS
JP   2005-031239   2/2005

(Continued)

OTHER PUBLICATIONS

'LM9833 48-Bit Color, 1200dpi USB Image Scanner' by National Semiconductor, Oct. 2001, discloses stepper motor control for a scanner with USB interface.*

(Continued)

*Primary Examiner* — Steven Snyder
(74) *Attorney, Agent, or Firm* — Nutter McClennen & Fish LLP; John J. Penny, Jr.; Derek P. Roller (57) ABSTRACT

A USB host is provided which can connect to a USB device via a USB hub, the USB host including, a combination storage unit that stores an upgrade allowable combination, for which upgrading of the USB device is allowed, among a combination of hub identification information for identifying the USB hub and device identification information for identifying the USB device; an identification information acquisition unit acquires hub identification information from the USB hub in compliance with USB standards when the USB hub is connected and acquires device identification information from the USB device in compliance with USB standards when the USB device is in connected to the USB hub; and a command transmission unit that transmits an upgrade command to the USB device when a combination of the acquired hub identification information and the acquired device identification information is identical to the combination stored in the combination storage unit.

7 Claims, 3 Drawing Sheets

U.S. PATENT DOCUMENTS

| | | | | |
|---|---|---|---|---|
| 2008/0033609 | A1* | 2/2008 | Razavi | 701/33 |
| 2008/0040713 | A1* | 2/2008 | Subbakrishna et al. | 717/173 |
| 2009/0063717 | A1* | 3/2009 | Bohm et al. | 710/8 |
| 2009/0158301 | A1* | 6/2009 | Holan et al. | 719/321 |
| 2010/0333174 | A1* | 12/2010 | Broerman et al. | 726/3 |

FOREIGN PATENT DOCUMENTS

| | | |
|---|---|---|
| JP | 2005-039322 | 2/2005 |
| JP | 2006-088656 | 4/2006 |
| JP | 2006-202017 | 8/2006 |
| JP | 2007-098850 | 4/2007 |
| JP | 2007-181140 | 7/2007 |

OTHER PUBLICATIONS

'Universal Serial Bus Device Class Specification for Device Firmware Upgrade' Version 1.0, May 13, 1999.*

'Universal Serial Bus Specification' Revision 2.0, Apr. 27, 2000, pp. i-ii, full document can be found at http://www.usb.org/developers/docs.*

* cited by examiner

FIG. 1

USB HOST, CONTROL METHOD THEREOF, COMPUTER PROGRAM, USB HUB AND USB DEVICE FOR ALLOWING UPGRADED OPERATION

The entire disclosure of Japanese Patent Application No. 2008-078330, filed Mar. 25, 2008 is expressly incorporated by reference herein.

BACKGROUND

1. Technical Field

The present invention relates to a USB host, a control method thereof; computer program, a USB hub, and a USB device.

2. Related Art

From the past, various studies have been proposed regarding a USB host performing communication with a USB device. For example, JP-A-2007-098850 discloses a color laser printer functioning as a USB host, in which when a USB memory, which is a USB device, is connected to a USB port thereof, a determination is made as to whether or not the USB memory is a USB key that allows execution of printing so that the execution of printing is allowed when the USB memory is the USB key while the execution of printing is inhibited when the USB memory is not the USB key.

However, in some types of PC peripherals, there is a case where one having the same device configuration is classified and sold as a higher grade model of high price and as a lower grade model of low price. In such a case, the higher grade model has no restrictions placed on its capability that can be exhibited by the device configuration while the lower grade model has restrictions on its capability. For example, if there is a scanner having a device configuration that it is capable of reading documents of a predetermined size with a scan speed of 60 pages per minute, the higher grade model is able to perform scanning with a scan speed of 60 pages per minute with no restrictions placed on its capability while the lower grade model is only able to perform scanning with a scan speed of 30 pages per minute because of the restrictions on its capability. Here, a case may be considered in which a user who purchased the lower grade model is discontented with the scan speed to purchase a higher grade model. However, in such a case, because the user has to purchase two scanners having substantially the same device configuration, it is not desirable to the user. In this respect, it may be desirable to solve the user's discontent with the scan speed by upgrading the lower grade model to the higher grade model. As one method of upgrading the scanner of the lower grade model to one of the higher grade model, a method that uses the USB key as disclosed in JP-A-2007-098850 may be considered. Specifically, the scanner is regarded as a USB host, and when a USB memory, which is a USB device, is connected to a USB port thereof, a determination is made as to whether or not the USB memory is the USB key that allows upgrading thereof so that the restriction on its capability is cancelled when the USB memory is the USB key.

However, in such a case, it is necessary to construct the device configuration so that the scanner functions as the USB host. Because it is a general use form that the PC functions as the USB host and the scanner functions as the USB device, it may be troublesome to construct the device configuration so that the scanner also functions as the USB host.

SUMMARY

An advantage of some aspects of the invention is that it provides a USB host, a control method thereof and computer program enabling upgrade of a USB device having a restricted capability with a simple mechanism. Another advantage of some aspects of the invention is that it provides a USB hub and a USB device which can be used in a state of being connected to the USB host.

In order to attain the above-mentioned objects, the invention employs the following.

According to an aspect of the invention, there is provided a USB host configured to be capable of connecting thereto a USB device via a USB hub, the USB host including: a combination storage unit that stores therein an upgrade allowable combination, for which upgrading of a capability of the USB device is allowed, among a combination of hub identification information for identifying the USB hub and device identification information for identifying the USB device; an identification information acquisition unit that acquires the hub identification information from the USB hub in compliance with the USB standards when the USB hub is connected thereto and that acquires the device identification information from the USB device in compliance with the USB standards when the USB device is connected to the USB hub; and a command transmission unit that transmits an upgrade command to the USB device when a combination of the acquired hub identification information and the acquired device identification information is identical with the combination stored in the combination storage unit.

In the USB host, the hub identification information is acquired from the USB hub in compliance with the USB standards when the USB hub is connected thereto, and the device identification information is acquired from the USB device in compliance with the USB standards when the USB device is connected to the USB hub. When the combination of the acquired hub identification information and the acquired device identification information is identical with the combination preliminarily stored in the combination storage unit, the upgrade command is transmitted to the USB device being connected thereto via the USB hub. In this manner, since the USB hub or the USB device connected to the USB host only needs to perform communication in compliance with the USB standards in the conventional manner, it is possible to upgrade the USB device with a simple mechanism.

Although the timing at which the command transmission unit transmits the upgrade command to the USB device is not particularly limited, the upgrade command may be transmitted at the same time as transmission of an operation execution command, or the upgrade command may be transmitted prior to transmission of the operation execution command to the USB device, for example.

In the USB host according to the above aspect of the invention, the combination storage unit may store a combination of hub identification information for identifying a USB hub having one upstream port and one downstream port and device identification information for identifying the USB device as the upgrade allowable combination. By doing so, a USB device connected to a USB hub having a plurality of downstream port is not a subject to upgrade. Therefore, it is possible to eliminate the risk that when a plurality of USB devices is connected to one USB hub, the entire USB devices are upgraded.

In the USB host according to the above aspect of the invention, the USB device may operate in a state where an original capability thereof is restricted when it has not received the upgrade command, and may operate in a state where restriction on the original capability thereof is cancelled when it has received the upgrade command. By doing so, when a user who purchased a USB device operating in a state where an original capability thereof is restricted wants to use a USB device operating in a state where the restriction on the original capability thereof is cancelled, the user does not need to additionally purchase the corresponding USB device but only needs to purchase a USB hub considering the combination of the hub identification information and the device identification information preliminarily stored in a storage unit. Therefore, it is possible to relieve the cost burden on the user.

In the USB host according to the above aspect of the invention, the combination storage unit may store the upgrade allowable combination to be correlated with the number of upgrade steps, and when the combination of the acquired hub identification information and the acquired device identification information is identical with the combination stored in the combination storage unit, the command transmission unit may transmit the upgrade command so that the USB device is able to recognize the number of steps correlated with the combination. By doing so, the capability of the USB device can be eventually upgraded in a stepwise fashion in accordance with the hub identification information of the USB hub.

In the USB host according to the above aspect of the invention, the hub identification information may be a vendor ID and a product ID of the USB hub, and the device identification information may be a vendor ID and a product ID of the USB device. By doing so, because the vendor ID and the product ID are contained in a descriptor which the USB host receives in compliance with the USB standards, they can be suitably used as the hub identification information and the device identification information.

According to another aspect of the invention, there is provided a method for controlling a USB host configured to be capable of connecting thereto a USB device via a USB hub and provided with a combination storage unit that stores therein an upgrade allowable combination, for which upgrading of a capability of the USB device is allowed, among a combination of hub identification information for identifying the USB hub and device identification information for identifying the USB device, the method including the steps of: (a) acquiring the hub identification information from the USB hub in compliance with the USB standards when the USB hub is connected thereto; (b) acquiring the device identification information from the USB device in compliance with the USB standards when the USB device is connected to the USB hub; and (c) transmitting an upgrade command to the USB device when the combination of the acquired hub identification information and the acquired device identification information is identical with the combination stored in the combination storage unit.

In the USB host control method, since the USB hub or the USB device connected to the USB host only needs to perform communication in compliance with the USB standards in the conventional manner, it is possible to upgrade the USB device with a simple mechanism. In addition, the USB host control method according to the above aspect of the invention may include a step for implementing any of the above-described functions of the USB host.

According to a further aspect of the invention, there is provided computer program for permitting one or a plurality of computers to execute the steps of the USB host control method according to the above aspect of the invention. The program may be recorded on a computer-readable recording medium (e.g., hard disc, ROM, FD, CD, DVD, and the like), may be transferred from one computer to another computer via a transfer medium (a communication network such as the Internet or a LAN), or may be transmitted in any other suitable form. Only a single computer may execute the program or a plurality of computers may share execution of the steps of the USB host control method according to the above aspect of the invention, whereby the same advantages as the USB host control method can be obtained.

According to a still further aspect of the invention, there is provided a USB hub for use in the USB host according to the above aspect of the invention, the USB hub including: a hub identification information storage unit that stores therein hub identification information included in the upgrade allowable combination; and a hub identification information transmission unit that transmits the hub identification information stored in the hub identification information storage unit to the USB host upon receipt of a request for acquisition of the hub identification information from the USB host in compliance with the USB standards.

The USB hub stores therein the hub identification information included in the combination stored in the combination storage unit of the above-described USB host. Therefore, a determination as to whether or not the USB host is to transmit the upgrade command to the USB device is made based on the device identification information of the USB device connected to the USB hub. Therefore, the USB hub is essential in obtaining the above-described advantages of the USB host. The USB hub may include one upstream port and one downstream port.

According to a still further aspect of the invention, there is provided a USB device configured to be used in a state of being connected to the USB host according to the above aspect of the invention, the USB device including: a device identification information storage unit that stores therein device identification information included in the upgrade allowable combination; a device identification information transmission unit that transmits the device identification information stored in the device identification information storage unit to the USB host upon receipt of a request for acquisition of the device identification information from the USB host in compliance with the USB standards; and an capability upgrade execution unit that upgrades a capability thereof upon receipt of the upgrade command from the USB host.

The USB device stores therein the device identification information included in the combination stored in the combination storage unit of the above-described USB host. Therefore, a determination as to whether or not the USB host is to transmit the upgrade command to the USB device is made based on the hub identification information of the USB hub connected to the USB device. Moreover, an original capability thereof is upgraded upon receipt of the upgrade command from the USB host. Therefore, the USB device is essential in obtaining the above-described advantages of the USB host.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
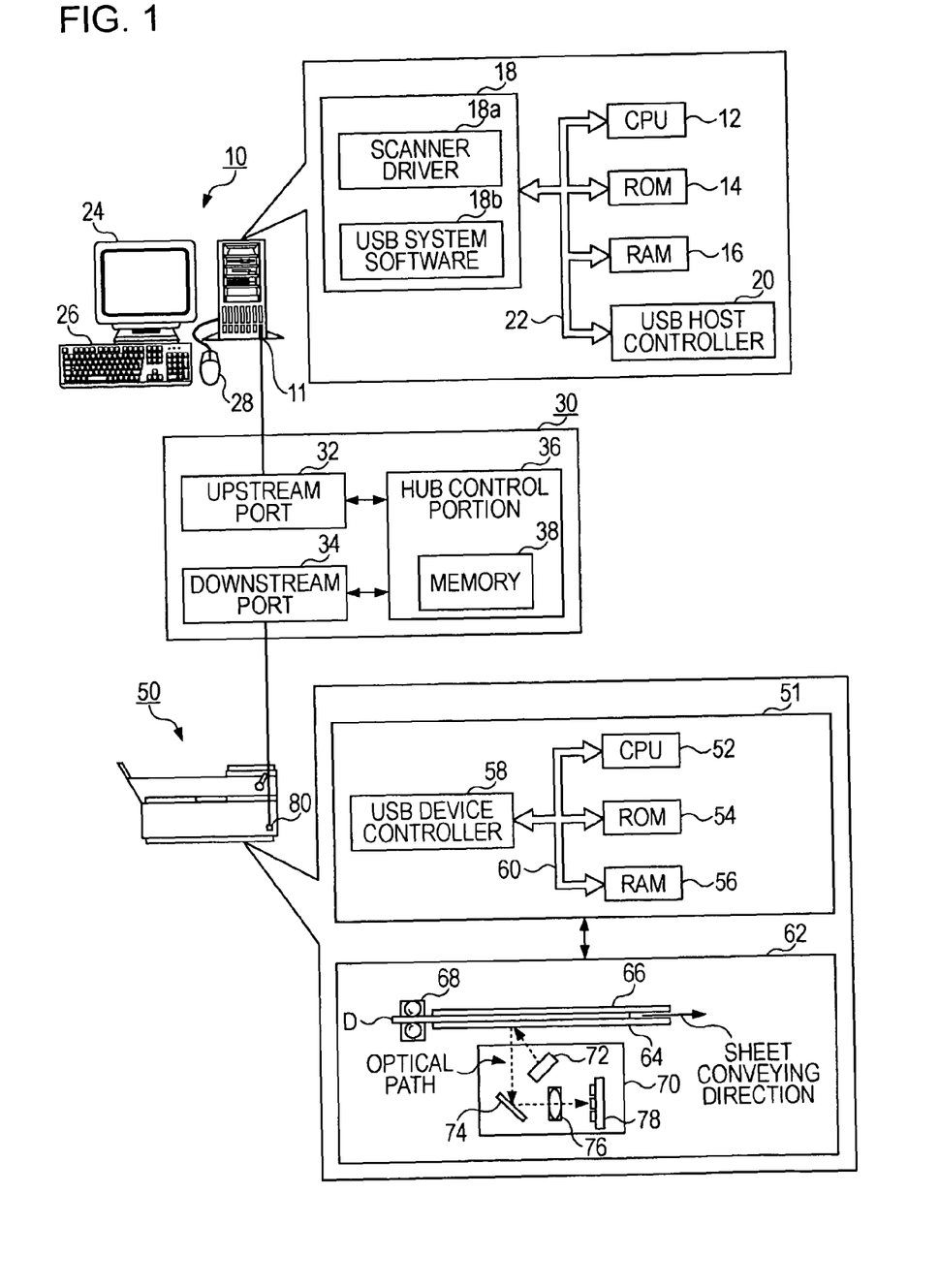
FIG. 1 is an explanatory diagram illustrating a simplified system configuration according to an embodiment of the invention.

Exemplary embodiments will be described herein below with reference to the accompanying drawings. FIG. 1 is an explanatory diagram illustrating a simplified system configuration according to an embodiment of the invention. This system is configured by a personal computer (hereinafter, referred to as "PC") 10 as a USB host, a USB hub 30 provided with one upstream port 32 and one downstream port 34, and a scanner 50 as a USB device.

The PC 10 has a USB port 11, which is a series A connector, to which a scanner 50 is connected via a USB hub 30. The PC 10 is constructed as a microprocessor composed mainly of a CPU 12, and includes a ROM 14 that stores therein a variety of processing programs or data, a RAM 16 that temporarily stores data, a large-capacity HDD 18, and a USB host controller 20 that perform communication with a USB device (in this example, the USB hub 30 or the scanner 50), which are connected with one another via a bus 22 so that signals can be exchanged with one another. Among them, the HDD 18 includes a scanner driver 18a that outputs a command to the scanner 50 or receives an operation status from the scanner 50 and a USB system software 18b that perform communication with a connected USB device in compliance with the USB 2.0 standards or dynamically load the scanner driver 18a onto a work area of the RAM 16. In addition, the PC 10 output a driver screen based on the scanner driver 18a to be displayed on a display 24 or receives instructions (scanner operation execution command or the like) from a user manipulating a keyboard 26 or a mouse 28 while viewing the driver screen.

Here, the scanner driver 18a stores therein, as a table, an upgrade allowable combination, for which upgrading of a capability of the scanner 50 is allowed, among a combination of a vendor ID and a product ID, which is hub identification information of the USB hub 30 connected to the USB port 11, and a vendor ID and a product ID, which is device identification information of the scanner 50. An example of the table is illustrated in Table 1. In the present embodiment, the vendor ID and the product ID of the USB hub 30 are "AAAA" and "BBBB," respectively, and the vendor ID and the product ID of the scanner 50 are "AAAA" and "XXXX," respectively. Moreover, the hub identification information in the upgrade allowable combination is hub identification information of a USB hub having one upstream port and one downstream port.

TABLE 1

| HUB IDENTIFICATION INFORMATION | | DEVICE IDENTIFICATION INFORMATION | |
| --- | --- | --- | --- |
| VENDOR ID | PRODUCT ID | VENDOR ID | PRODUCT ID |
| AAAA | BBBB | AAAA | XXXX |
| AAAA | CCCC | AAAA | YYYY |
| AAAA | DDDD | AAAA | ZZZZ |

The USB hub 30 is configured to have an upstream port 32 being connected to a USB host (in this example, the PC 10) and have a downstream port 34 being connected to a USB device (in this example, the scanner 50), so that a variety of processing is performed by the hub control portion 36. The upstream port 32 has a buffer function for input/output data with respect to the USB host, a transceiver function in compliance with the USB standards, and the like. The downstream port 34 has a buffer function for input/output data with respect to the USB device, a transceiver function in compliance with the USB 2.0 standards, and the like. The hub control portion 36 is a circuit configured to perform processing in compliance with the USB 2.0 standards, such as data transmission between the upstream port 32 and the downstream port 34, bus speed detection or transaction partitioning. The USB hub 30 is regarded as a USB device as seen from a USB host and is configured such that upon receipt of a request for acquisition of a device descriptor, a configuration descriptor or the like from the USB host, a response thereto is output to the USB host. Here, the device descriptor is information for identifying a device and includes a vendor ID for identifying a vendor supplying the device, a product ID for identifying a product, and the like. The USB hub 30 has stored therein such a device descriptor in a memory 38 of the hub control portion 36. The scanner 50 has a USB port 80, which is a series B connector, to which the PC 10 is connected via the USB hub 30. The scanner 50 includes a scanner control portion 51 that controls an overall operation of the scanner 50 and a scanner mechanism 62 that is controlled by the scanner control portion 51. The scanner control portion 51 is constructed by a microprocessor composed mainly of a CPU 52, and includes a ROM 54 that stores therein a variety of processing programs or data (including the device descriptor of the scanner 50), a RAM 56 that temporarily stores data, and a USB device controller 58 that perform communication with the USB host, which are connected with one another via a bus 60 so that signals can be exchanged with one another. In addition, when the scanner 50 receives, from the USB host, a request for acquisition of the device descriptor, the configuration descriptor or the like, the USB device controller 58 outputs a response thereto to the USB host. The scanner mechanism 62 includes an automatic sheet feeder 68 that is configured to convey one sheet of documents D (for example, checks) stacked on a non-illustrated stacker to be located between a glass plate 64 and a cover 66, a light source 72 that irradiates light onto a document D mounted on a carriage 70 below the glass plate 64, and an image sensor 78 that is configured to receive light reflected from the document D mounted on the carriage 70 through the intervention of a mirror 74 and a focusing lens 76 to thereby read images. The light source 72 is configured such that light from a plurality of white LEDs arranged in a main scanning direction (a direction perpendicular to the conveying direction of the document D) is linearly irradiated onto the glass plate 64. The image sensor 78 has a plurality of image-pickup elements arranged in the main scanning direction and is configured to convert light received through the intervention of the mirror 74 and the focusing lens 76 to electric charges to thereby output an analog signal. This analog signal is converted to a digital signal by a non-illustrated A/D conversion circuit and is then stored in a work area of the RAM 56 as scanner data. Here, it is to be noted that a CCD image sensor or a CMOS image sensor may be employed as the image sensor 78. Moreover, although the light source 72 is exemplified by a white LED, the white light may be irradiated by means of a red LED, a green LED, a blue LED, a mercury lamp, or the like.

Although the scanner 50 is configured to have a capability of reading documents of a check size with a scan speed of 60 pages per minute, restrictions are generally placed on such a capability so that documents are read with a scan speed of 30 pages per minute. In addition, it will be assumed that as a higher grade model of the scanner 50, a scanner having the same device construction but with no restrictions on its capability is being sold at a higher price than this scanner 50.

Next, the operations of the thus-configured system according to the present embodiment will be described herein below. The operations will be described in the following order: a USB device recognition routine executed by the USB host controller 20 of the PC 10; an upgrade processing routine executed by the CPU 12 of the PC 10; and the operation of the scanner 50.

Figure 2:
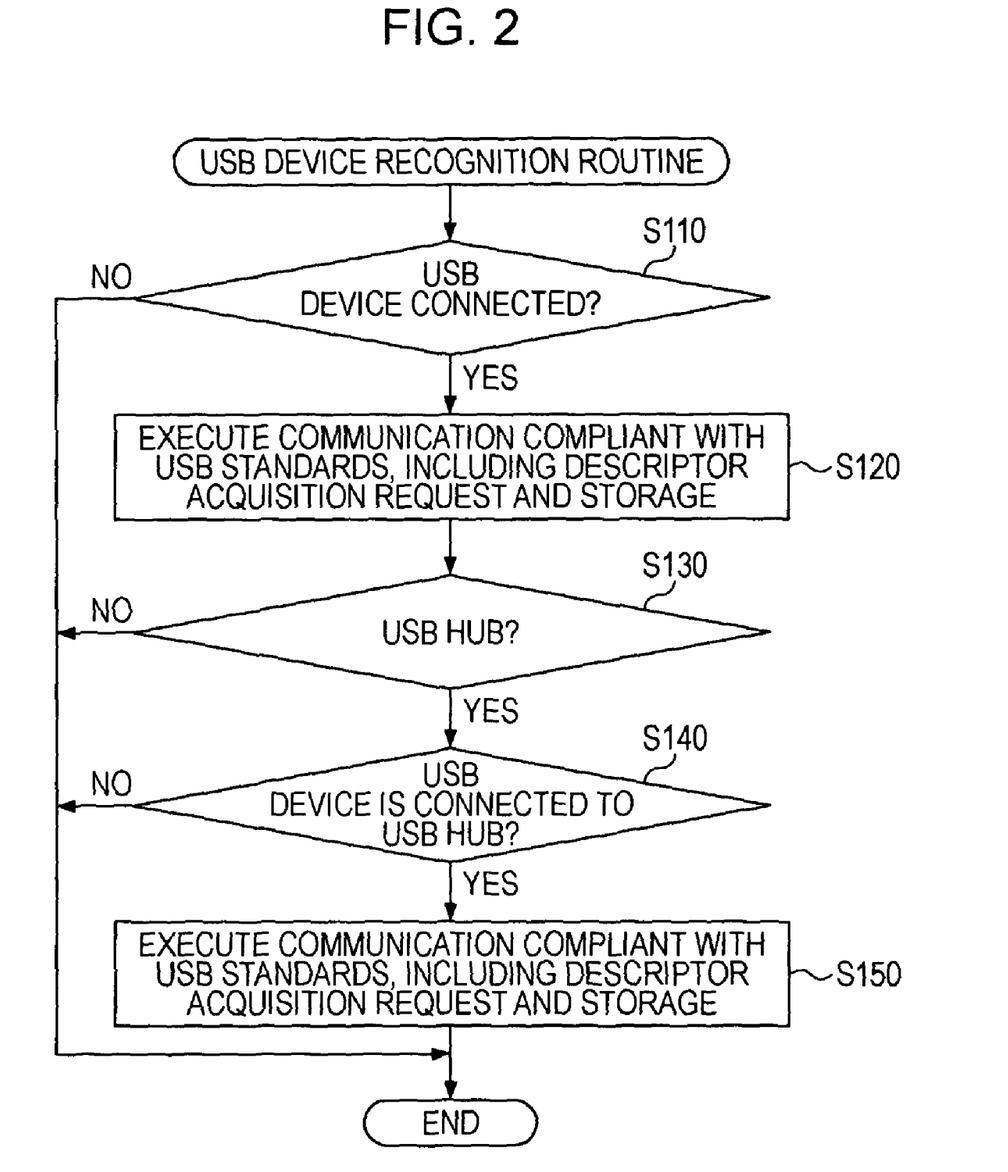
FIG. 2 is a flow chart of a USB device recognition routine.

FIG. 2 is a flow chart of a USB device recognition routine. This routine is repeatedly executed every predetermined timings (for example, every several seconds) by the USB host controller 20 by means of USB system software 18*b*. When this routine is started, the USB host controller 20 determines whether or not a USB device is connected to the USB port 11 (step S110). Whether or not the USB device is connected can be determined on the basis of a VBUS status of the USB port 11, for example. If the USB device is not connected, this routine ends without performing any processing. On the other hand, if the USB device is connected, communication in compliance with the USB standards with the USB device is executed (step S120. This communication includes transmission of a request for acquisition of a descriptor (a device descriptor, a configuration descriptor and the like) to the USB device connected to the USB port 11, reception of the descriptor in response thereto, and storage of the received descriptor in the RAM 16. Since the descriptor includes therein the vendor ID and the product ID of the connected USB device, these IDs are stored in the RAM 16. Subsequently, a determination is made based on the configuration descriptor obtained as the result of communication as to whether or not the USB device connected to the USB port 11 is a USB hub (step S130). If it is a USB hub, then, a determination is further made as to whether or not a USB device is connected to the USB hub (step S140). In this example, because the USB hub 30 is connected to the USB port 11 and the scanner 50 is connected to the USB hub 30, a positive determination result is obtained in both steps S130 and S140. Subsequently, communication in compliance with the USB standards with the USB device connected to the USB hub is executed (step S150). This communication includes transmission of a request for acquisition of a descriptor to the USB device connected to the USB hub, reception of the descriptor in response thereto, and storage of the received descriptor in the RAM 16. Since the descriptor includes therein the vendor ID and the product ID of the connected USB device, these IDs are stored in the RAM 16. This routine ends after the operation of step S150 is performed or when a negative determination result is obtained in any of steps S130 and S140. In addition, when a USB device is connected to the USB hub after a negative determination result is obtained in step S140, an operation subsequent to step S150 of this routine is performed.

Figure 3:
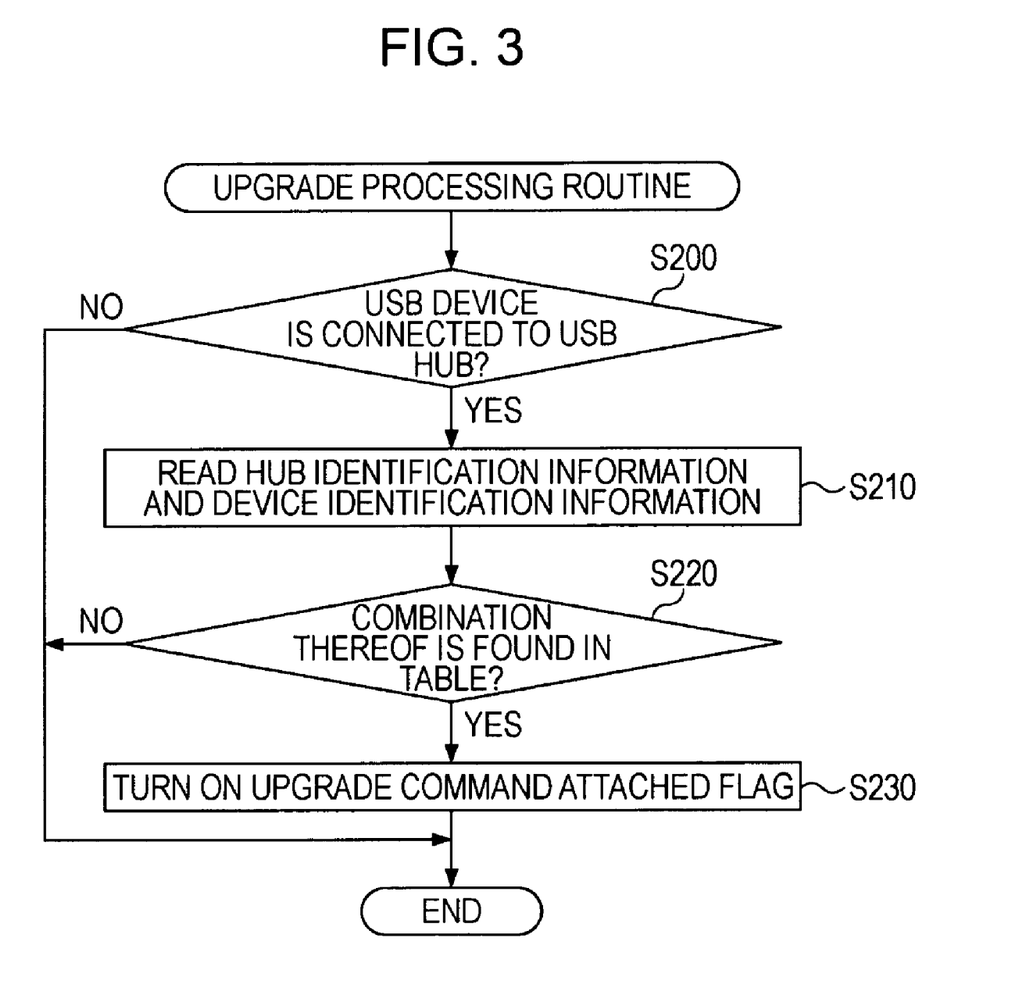
FIG. 3 is a flow chart of an upgrade processing routine.

Next, an upgrade processing routine executed by the CPU 12 of the PC 10 will be described. FIG. 3 is a flow chart of an upgrade processing routine. This routine is executed when new identification information is stored in the RAM 16 in the above-described USB device recognition routine. When this routine is started, the CPU 12 makes a determination as to whether or not a USB hub is connected to the USB port 11 and a USB device is connected to the USB hub (step S200). When a negative determination result is obtained, this routine ends. On the other hand, if a positive determination result is obtained, the vendor ID and the product ID of the USB hub, as the hub identification information, and the vendor ID and the product ID of the USB device connected to the USB hub, as the device identification information, are read from the RAM 16 (step S210). Then, a determination is made as to whether or not a combination of the read hub identification information and the read device identification information is identical with an upgrade allowable combination, for which upgrading of the capability of the USB device connected to the USB hub is allowed (step S220). When the combination of the hub identification information and the device identification information is not identical with the upgrade allowable combination, this routine ends. In this example, because the USB hub 30 is connected to the USB port 11 and the scanner 50 is connected to the USB hub 30, a determination is made in step S220 as to whether or not the combination of the hub identification information and the scanner identification information is found in the table of Table 1. As described above, because the combination of the hub identification information of the USB hub 30 and the device identification information of the scanner 50 is found in the table of Table 1, a positive determination result is obtained in step S220. When a positive determination result is obtained in step S220, an upgrade command attached flag Fc is set to a value of 1 (step S230) and this routine ends. When the upgrade command attached flag Fc has a value of 0, the upgrade command is not attached to a scan execution command when the scan execution command is transmitted from a non-illustrated scanner driver screen to the scanner 50. When the upgrade command attached flag Fc has a value of 1, the upgrade command is attached to the scan execution command to be transmitted at the same time. This upgrade command attached flag Fc is reset to 0 when the PC 10 transitions from an OFF state to an ON state or when connection between the scanner 50 and the PC 10 is cut after the flag is set to a value of 1.

Finally, the operation of the scanner 50 will be described herein below. It will be assumed that the scanner 50 is in a state where a number of documents (for example, checks) are stacked on a non-illustrated stacker of the automatic sheet feeder 68. Moreover, it will be assumed that in such a state, a user activates the PC 10 and the scanner driver 18*a* and clicks on a scan execute button using the mouse 28 from a non-illustrated scanner driver screen of the display 24. At this time, the CPU 12 of the PC 10 transmits a scan execution command together with an upgrade command to the scanner 50 because the upgrade command attached flag Fc has a value of 1. When the scanner 50 receives these commands, the CPU 52 cancels the restrictions on a scan speed in accordance with the upgrade command and executes a document reading operation with a scan speed of 60 pages per minute in a check size. On the other hand, if the scanner 50 receives only the scan execution command, then, the CPU 52 executes a document reading operation with a scan speed of 30 pages per minute in a check size without cancelling the restrictions on the scan speed.

Here, the correspondence between the constituent elements of the present embodiment and the constituent elements of the invention will be described. The PC 10 of the present embodiment corresponds to the USB host of the invention, the HDD 18 to the combination storage unit, the USB host controller 20 to the identification information acquisition unit, and the CPU 12 to the command transmission unit, respectively. The operation of the PC 10 has been described in the present embodiment, whereby an example of the USB host control method according to the invention will be clearly understood from the description. Moreover, the USB hub 30 of the present embodiment corresponds to the USB hub of the invention, the memory 38 to the hub identification information storage unit, and the hub control portion 36 to the hub identification information transmission unit, respectively. Furthermore, the scanner 50 of the present embodiment corresponds to the USB device of the invention, the ROM 54 to the device identification information storage unit, the USB device controller 58 to the device identification information transmission unit, and the CPU 52 to the capability upgrade execution unit, respectively.

According to the present embodiment described above, although it is necessary to create the scanner driver 18*a* so that the PC 10 executes the upgrade processing routine, because the USB hub 30 and the scanner 50 connected to the PC 10 may only need to perform communication in compliance with the USB standards in the conventional manner, it is possible to upgrade the scanner 50 with a simple mechanism. Moreover, since the upgrade allowable combination of the hub identification information and the device identification information includes the hub identification information for identifying the USB hub 30 having one upstream port 32 and one downstream port 34, a scanner connected to a USB hub having a plurality of downstream ports is not a subject to upgrade. Therefore, it is possible to eliminate the risk that when a plurality of scanners is connected to one USB hub, the entire scanners are upgraded.

Moreover, when a user who purchased the scanner 50 wants to use a higher grade model having a faster scan speed, the user does not need to additionally purchase an expensive scanner of the higher grade model but only needs to purchase the USB hub 30 considering the combination of the hub identification information and the device identification information, for which upgrading is allowed, whereby the same scan speed as the higher grade model is achieved. Therefore, it is possible to relieve the cost burden on the user.

Furthermore, because the vendor ID and the product ID are contained in the descriptor which is delivered to the PC 10 in compliance with the USB standards, they can be suitably used as the hub identification information and the device identification information.

Furthermore, since the USB hub 30 stores the hub identification information included in the upgrade allowable combination in the memory 38, a determination as to whether or not the PC 10 is to transmit the upgrade command to the scanner is made on the basis of the device identification information of the scanner connected to the USB hub 30. In addition, since the scanner 50 stores the device identification information included in the upgrade allowable combination in the ROM 54, a determination as to whether or not the PC 10 is to transmit the upgrade command to the scanner 50 is made on the basis of the hub identification information of the USB hub.

It should be understood that the invention is by no means limited to the above-described embodiment but may be implemented in a variety of forms belonging to the technical scope of the invention.

For example, in the above-described embodiment, the scan speed was upgraded from 30 pages per minute to 60 pages per minute when the scanner 50 received the upgrade command. The combination of the hub identification information and the device identification information may be stored in the HDD 18 of the PC 10 to be correlated with the number of upgrade steps (how many steps will be upgraded). When the combination of the hub identification information and the device identification information, which are acquired by the PC 10, is identical with the combination stored in the HDD 18, an upgrade command corresponding to the number of upgrade steps correlated with the combination may be transmitted to the scanner 50. For example, a description will be provided for a case where the table of Table 2 is stored in the HDD 18 of the PC 10. When the product ID of the hub identification information of the USB hub 30 is "BBBB," an upgrade command for speeding up one step (for example, 40 pages per minute) may be transmitted to the scanner 50, while an upgrade command for speeding up two steps (for example, 50 pages per minute) may be transmitted for the product ID of "CCCC" and an upgrade command for speeding up three steps (for example, 60 pages per minute) may be transmitted for the product ID of "DDDD." By doing so, it is possible to upgrade the capability of the scanner 50 in a stepwise manner in accordance with the type of the USB hub 30.

TABLE 2

| HUB IDENTIFICATION INFORMATION | | DEVICE IDENTIFICATION INFORMATION | | NUMBER OF |
|---|---|---|---|---|
| VENDOR ID | PRODUCT ID | VENDOR ID | PRODUCT ID | UPGRADE STEPS |
| AAAA | BBBB | AAAA | XXXX | 1 STEP |
| AAAA | CCCC | AAAA | XXXX | 2 STEPS |
| AAAA | DDDD | AAAA | XXXX | 3 STEPS |

Although in the above-described embodiment, the scan speed of the scanner 50 was upgraded when the combination of the hub identification information and the device identification information, which was acquired by the PC 10, was identical with the combination stored in the HDD 18, the subject of upgrade is not limited to the scan speed. For example, the resolution of the scanner 50 may be upgraded from low resolution to high resolution, and the scanner 50 may be upgraded from monochromatic capability to full-color capability. In addition, the capability correlated with the combination of the hub identification information and the device identification information may be upgraded. For example, a description will be provided for a case where the table of Table 3 is stored in the HDD 18 of the PC 10. When the product ID of the hub identification information of the USB hub 30 is "BBBB," an upgrade command for improving the scan speed may be transmitted to the scanner 50 while an upgrade command for improving the resolution may be transmitted for the product ID of "CCCC" and an upgrade command for improvement from monochromatic capability to full-color capability may be transmitted for the product ID of "DDDD." By doing so, it is possible to upgrade the scanner 50 in terms of each capability in accordance with the type of the USB hub 30. In addition, in upgrading in terms of each capability, not only a single capability but also a plurality of capabilities may be upgraded.

TABLE 3

| HUB IDENTIFICATION INFORMATION | | DEVICE IDENTIFICATION INFORMATION | | |
|---|---|---|---|---|
| VENDOR ID | PRODUCT ID | VENDOR ID | PRODUCT ID | CAPABILITIES |
| AAAA | BBBB | AAAA | XXXX | SCAN SPEED |
| AAAA | CCCC | AAAA | XXXX | RESOLUTION |
| AAAA | DDDD | AAAA | XXXX | COLOR |

Although in the above-described embodiment, the USB device has been exemplified by the scanner 50, the invention may be applied to other devices different from the scanner. For example, an ink jet printer or a laser printer may be upgraded so that a print speed thereof is upgraded from low speed to high speed, a resolution thereof is upgraded from low resolution to high resolution, or color capability thereof is upgraded from monochromatic capability to full-color capability.

In the above-described embodiment, the upgrade command attached flag Fc is set to a value of 1 in step S230 of the upgrade processing routine, and thereafter, the upgrade command is transmitted together with the scan execution command. However, the upgrade command may be transmitted to the scanner 50 in step S230. In such a case, upon receipt of the upgrade command, the scanner 50 changes the value of an upgrade flag Fu from 0 to 1 and resets the upgrade flag Fu to 0 when the scanner is powered off or when the USB connection with the USB hub 30 or the PC 10 is cut. Moreover, the scanner 50 is set such that the scan speed is set to 30 pages per minute when the upgrade flag Fu is set to 0 while the scan speed is upgraded to 60 pages per minute when the upgrade flag Fu is set to 1. Even in such a case, it is possible to obtain the same advantages as the above-described embodiment.

Although the above-described embodiment has been described with respect to the USB hub 30 having one upstream port 32 and one downstream port 34, a USB hub having a plurality of downstream ports may be employed. In such a case, the PC 10 performs communication with a USB device connected to each of the plurality of downstream ports in compliance with the USB standards whereby the USB device connected to each downstream port is recognized and the device identification information of each USB device is acquired. Therefore, a determination is made for each USB device as to whether or not the combination of the hub identification information and the device identification information is identical with the upgrade allowable combination, and the upgrade command is transmitted to the USB device for which a positive determination result is obtained. Moreover, in this case, although it is allowed to upgrade a plurality of USB devices for one USB hub, the vendor may set the selling price to as high as the number of USB devices.

Although in the above-described embodiment, the USB host has been exemplified by the PC 10, the invention can be applied to other USB hosts different from the PC 10.

Because the USB hub 30 according to the above-described embodiment is provided with one upstream port 32 and one downstream port 34, it can be referred to as a USB extension cord.

What is claimed is:

1. A Universal Serial Bus (USB) host configured to be capable of connecting thereto a USB device via a USB hub, the USB host comprising:
   a combination storage unit that stores therein an upgrade allowable combination, for which upgrading of a capability of the USB device is allowed, among a combination of hub identification information for identifying the USB hub and device identification information for identifying the USB device;
   an identification information acquisition unit that acquires the hub identification information from the USB hub when the USB hub is connected thereto and that acquires the device identification information from the USB device in compliance with the USB standards when the USB device is connected to the USB hub; and
   a command transmission unit that transmits an upgrade command to the USB device when a combination of the acquired hub identification information and the acquired device identification information is identical with the combination stored in the combination storage unit;
   wherein the combination storage unit stores the upgrade allowable combination to be correlated with a number of upgrade steps, and
   wherein when the combination of the acquired hub identification information and the acquired device identification information is identical with the combination stored in the combination storage unit, the command transmission unit transmits the upgrade command so that the USB device is able to recognize the number of steps correlated with the combination.

2. The USB host according to claim 1, wherein the combination storage unit stores a combination of hub identification information for identifying a USB hub having one upstream port and one downstream port and device identification information for identifying the USB device as the upgrade allowable combination.

3. The USB host according to claim 1, wherein the USB device operates in a state where an original capability thereof is restricted when it has not received the upgrade command, and operates in a state where restriction on the original capability thereof is cancelled when it has received the upgrade command.

4. The USB host according to claim 1,
   wherein the hub identification information is a vendor identification (ID) and a product ID of the USB hub, and
   wherein the device identification information is a vendor ID and a product ID of the USB device.

5. A USB hub for use in the USB host according to claim 1, the USB hub comprising:
   a hub identification information storage unit that stores therein hub identification information included in the upgrade allowable combination; and
   a hub identification information transmission unit that transmits the hub identification information stored in the hub identification information storage unit to the USB host upon receipt of a request for acquisition of the hub identification information from the USB host in compliance with the USB standards.

6. The USB hub according to claim 5, comprising one upstream port and one downstream port.

7. A USB device configured to be used in a state of being connected to the USB host according to claim 1, the USB device comprising:
   a device identification information storage unit that stores therein device identification information included in the upgrade allowable combination;
   a device identification information transmission unit that transmits the device identification information stored in the device identification information storage unit to the USB host upon receipt of a request for acquisition of the device identification information from the USB host in compliance with the USB standards; and
   a capability upgrade execution unit that upgrades a capability thereof upon receipt of the upgrade command from the USB host.

* * * * *